(12) United States Patent
Russell

(10) Patent No.: US 7,483,587 B2
(45) Date of Patent: Jan. 27, 2009

(54) ITERATIVE FILTERING FOR DITHERED IMAGING

(75) Inventor: Andrew Ian Russell, Kingston 6 (JM)

(73) Assignee: Texas Instruments Incorporated, Dallas, TX (US)

( * ) Notice: Subject to any disclaimer, the term of this patent is extended or adjusted under 35 U.S.C. 154(b) by 531 days.

(21) Appl. No.: 11/119,232

(22) Filed: Apr. 29, 2005

(65) Prior Publication Data
US 2006/0245662 A1    Nov. 2, 2006

(51) Int. Cl.
*G06K 9/36* (2006.01)

(52) U.S. Cl. .................. 382/276; 382/270; 358/3.2; 358/3.13

(58) Field of Classification Search .......... 382/276
See application file for complete search history.

(56) References Cited

U.S. PATENT DOCUMENTS

| | | | | |
|---|---|---|---|---|
| 5,315,669 A | * | 5/1994 | Kumagai | 382/270 |
| 5,670,920 A | * | 9/1997 | Morgan | 333/195 |
| 5,760,920 A | * | 6/1998 | Lin et al. | 358/3.2 |
| 6,829,063 B1 | * | 12/2004 | Allebach et al. | 358/3.13 |

OTHER PUBLICATIONS

Kreuger, Ralf, "*Virtex-EM FIR Filter for Video Applications*", XILINX, XAPP241 (v1.1), www.xilinx.com, pp. 1-6, Oct. 3, 2000.

Pending U.S. Appl. No. 10/750,284, filed Dec. 31, 2003, entitled "Wavelength Discriminated Image Dithering", 19 pages specification, claims and abstract, 5 pages of drawings, inventor Andrew Ian Russell.
Pending U.S. Appl. No. 11/062,363, filed Feb. 22, 2005, entitled "System And Method For Local Saturation Adjustment", 22 pages specification, claims and abstract, 4 pages of drawings, inventors Kempf, et al.
Pending U.S. Appl. No. 11/063,039, filed Feb. 22, 2005, entitled "System And Method For Local Value Adjustment", 23 pages specification, claims and abstract, 4 pages of drawings, inventors Kempf et al.
"Verilog HDL: Two-Dimensional FIR Filter", ALTERA, Copyright © 1995-2005 Altera Corporation, http://www.altera.com/support/examples/verilog/ver_twod_fir.html, 3 pages, printed Apr. 2005.

* cited by examiner

*Primary Examiner*—Samir A Ahmed
*Assistant Examiner*—Aklilu k Woldemariam
(74) *Attorney, Agent, or Firm*—Wade James Brady, III; Frederick J. Telecky, Jr.

(57) ABSTRACT

Filtering image information to generate a dithered image includes receiving input image information corresponding to an image generated using a first array comprising a first number of smaller pixels. Intermediate image information is generated from the input image information. The intermediate image information is generated to produce the image using a second array comprising a second number of larger pixels, where the second number less than the first number. A frequency response associated with the image produced using the second array exhibits effects. The intermediate image information is repeatedly filtered to generate updated image information from the intermediate image information and to compensate for the effects. Sub-image information is generated from the updated image information, the sub-image information corresponding to a dithered image.

18 Claims, 8 Drawing Sheets

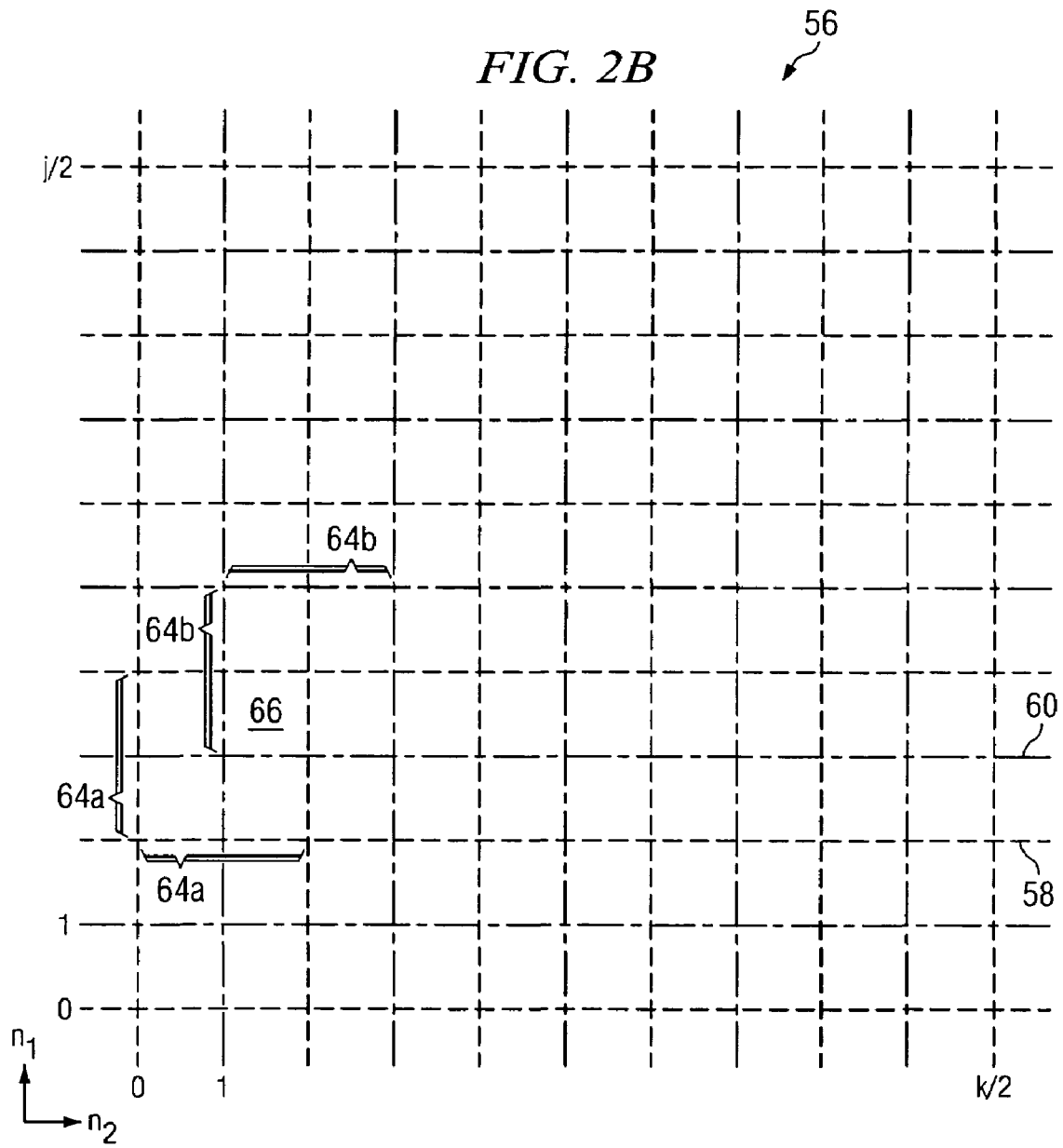

US 7,483,587 B2

ITERATIVE FILTERING FOR DITHERED IMAGING

TECHNICAL FIELD

This invention relates generally to displaying images and more specifically to iterative filtering for dithered imaging.

BACKGROUND

Light processing systems often involve directing light towards a display such that an image is produced. One way of effecting such an image is through the use of digital micromirror devices (DMD) available from Texas Instruments. In general, light is shined on a DMD array having numerous micromirrors. Each micromirror is selectively controlled to reflect the light towards a particular portion of a display, such as a pixel. The angle of a micromirror can be changed to switch a pixel to an "on" or "off" state. The micromirrors can maintain their on or off state for controlled display times.

Conventionally, each micromirror of an array corresponds to a pixel of the display. Accordingly, the resolution of the display is limited by the number of micromirrors of an array. Typically, however, an array having more micromirrors is more expensive to produce than an array having fewer micromirrors. Consumers are desirous of having decreased costs, but maintaining resolution. Thus, approaches to decrease the number of micromirrors of the array, while maintaining the resolution of the display, have been developed.

One such approach is sometimes referred to as "dithering." Dithering involves generating a display from an array having fewer micromirrors. The display is shifted a fraction of a pixel to attempt to give the illusion of a display generated from an array having more micromirrors. One challenge with such a technique is achieving the resolution associated with the array having more micromirrors.

SUMMARY OF THE DISCLOSURE

A method and system for filtering an image is provided. According to one embodiment, filtering image information to generate a dithered image includes receiving input image information corresponding to an image generated using a first array comprising a first number of smaller pixels. Intermediate image information is generated from the input image information. The intermediate image information is generated to produce the image using a second array comprising a second number of larger pixels, where the second number less than the first number. A frequency response associated with the image produced using the second array exhibits effects. The intermediate image information is repeatedly filtered to generate updated image information from the intermediate image information and to compensate for the effects. Sub-image information is generated from the updated image information, the sub-image information corresponding to a dithered image.

Certain embodiments of the invention may provide one or more technical advantages. A technical advantage of one embodiment may be that undesired effects resulting from converting image information from an array having more micromirrors to an array having fewer micromirrors may be reduced. Reducing the undesired effects may improve the quality of the resulting dithered image.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2B is a grid representing a portion of an example array having pixels larger than those of the array portion of FIG. 2A;

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
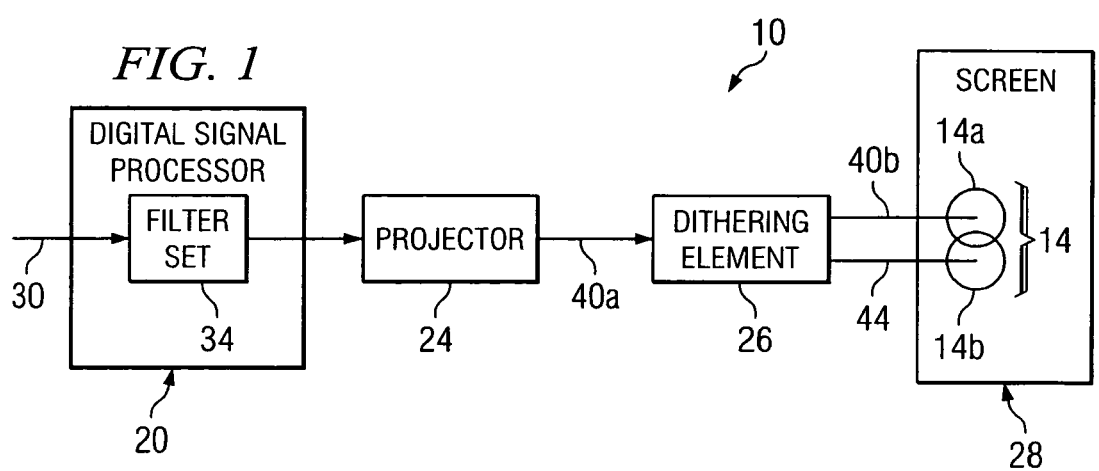
FIG. 1 is a block diagram illustrating one embodiment of a projection display system that uses a digital signal processor to improve perceived resolution of a dithered image.

FIG. 1 is a block diagram illustrating one embodiment of a projection display system that has a digital signal processor that filters image information to improve perceived resolution of a dithered image. Projection display system 10 includes a digital signal processor 20, a projector 24, a dithering element 26, and a screen 28. In general, digital signal processor 20 performs filtering procedures on input image information to generate sub-image information. The filtering procedures involve iteratively filtering the image information to compensate for undesired effects introduced during other filtering procedures. Projector 24 and dithering element 26 generate sub-images from the sub-image information for display on screen 28. The sub-images are dithered to give the illusion of a single image. Other embodiments of projection display system 10 may be employed without departing from the scope of this disclosure.

According to particular embodiments, digital signal processor 20 receives input image information, performs filtering procedures on the input image information, and generates sub-image information from the filtered image information. Image information may refer to information that may be used to generate an image, and may include one or more pixel values for each pixel of at least a portion of the image. Image information may be provided in a signal digitized through modulation such as pulse-code-modulation (PCM) or pulse-width-modulation (PWM).

According to the illustrated embodiment, digital signal processor 20 includes an input 30 and a set of one or more filters 34 coupled as shown. Input 30 receives input image information. The input image information may represent an image generated from an array having more smaller pixels. An example array of smaller pixels is described in more detail with reference to FIG. 3A.

Figure 2A:
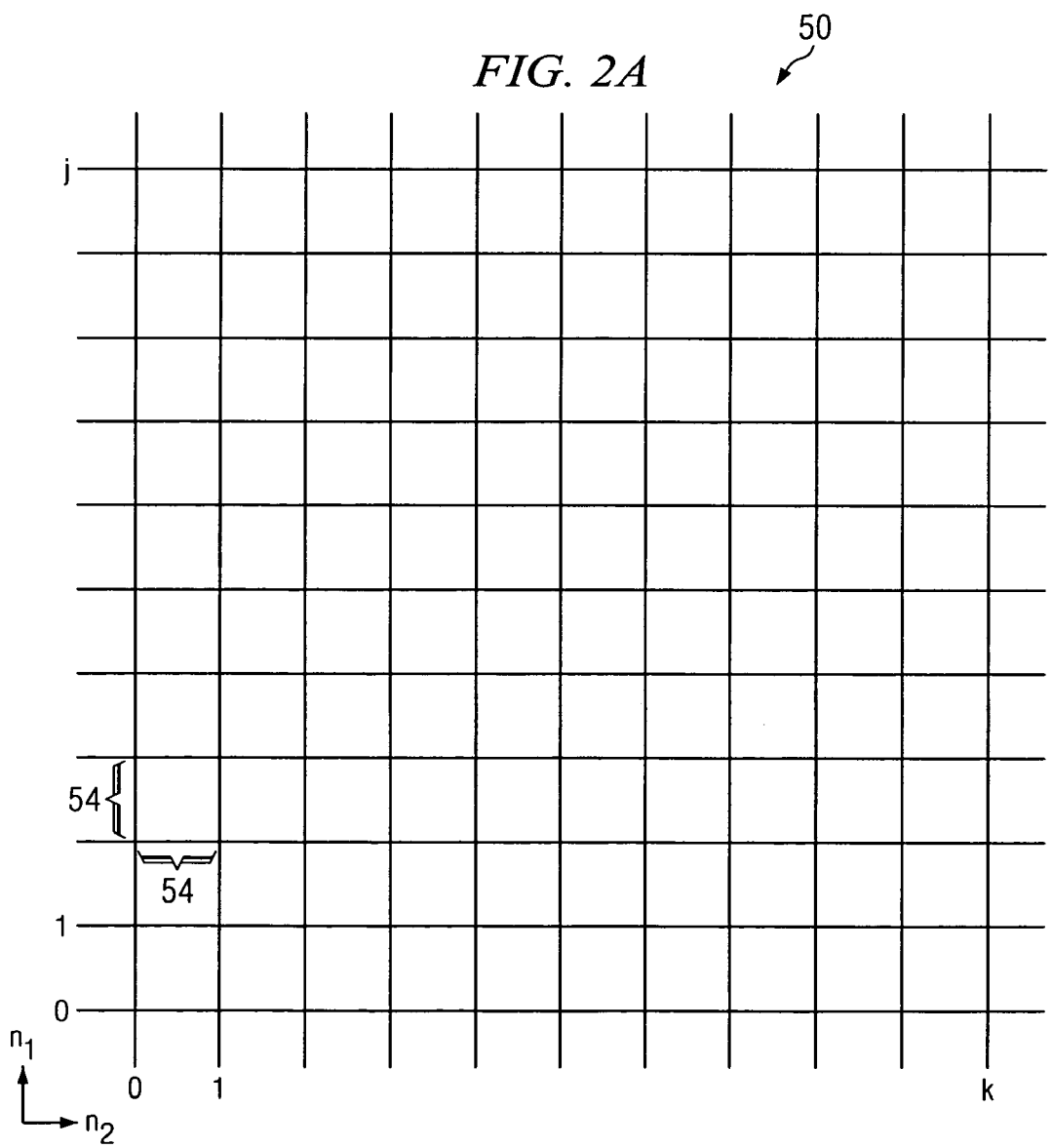
FIG. 2A is a grid representing a portion of an example array having smaller pixels.

FIG. 2A is a grid representing a portion 50 of an example array of smaller pixels. According to the example, a square of the grid represents a pixel 54 of the example array. The illustrated portion 50 includes j×k pixels 54 as measured along the $n_1$ and $n_2$ coordinate axes. A side of pixel 54 may have any suitable length, for example, within the range of 1 millimeter to 20 millimeters.

Referring back to FIG. 1, filtering procedures may be performed by conversion filter set 34. Filter set 34 filters the input image information to generate intermediate image information. The intermediate image information may be used to generate the image using an array having fewer larger pixels. An example array of larger pixels is described in more detail with reference to FIG. 2B.

FIG. 2B is a grid representing a portion 56 of an example array having pixels larger than those of the array portion 20 of FIG. 2A. Portion 56 is illustrated in two positions. Dotted lines 58 represent portion 56 at a first position, and dotted-dashed lines 60 represent portion 56 at a second position. The area of portion 56 may be such that portion 56 is operable to generate the same images as portion 50. For example, portion 56 may have an area substantially similar to that of portion 50.

According to the example, a square of the grid represents a pixel 64 of the array. The illustrated portion 50 includes $$\frac{j}{2} \times \frac{k}{2}$$

pixels 64. A side of pixel 64 may have any suitable length, for example, within the range of 2 millimeters to 40 millimeters. According to one embodiment, a larger pixel 64 may be approximately twice as large in a vertical direction and in a horizontal direction than a smaller pixel 54, so the larger pixel 64 may have an area that is approximately four times that of the smaller pixel 54. Accordingly, portion 56 has one-quarter of the number of pixels than that of portion 50. Larger pixel 64, however, may have any suitable dimensions and area relative to smaller pixel 54.

To improve the resolution of the array with the fewer larger pixels 64, the larger pixels 64 may be dithered, or rapidly moved from a first position to a second position. According to the example, pixels 64a are in the first position, and pixels 64b are in the second position. Pixels 64a displayed in a first position may yield a first sub-image, and pixels 64b displayed in the second position may generate a second sub-image.

The values of the smaller pixels 54 may be converted to values of the larger pixels 64. According to the illustrated embodiment, a smaller pixel 54 may be represented by a quadrant 66 of a corresponding pixel 64a at the first position and the corresponding pixel 64b at the second position. The value of a smaller pixel represented by quadrant 66 may be regarded as the average of the values of corresponding larger pixels 64a and 64b.

Portion 50 of smaller pixels may be converted to portion 56 of larger pixels applying a number decreasing function and a size increasing function. A number decreasing function may refer to a function that selectively decreases the number of pixels, and may be applied to convert image information from an array of more smaller pixels to an array of fewer larger pixels. An example of a number decreasing function includes a checkerboard sampling function. A checkerboard sampling function may multiply half of the pixel values of the input image information by zero and multiply the remaining pixel values by two.

An example number decreasing function may be a checkerboard sampling function given by Equation (1):

$$S = \{s_{n_1 n_2}\} = \begin{cases} 0 & \text{if } n_1 - n_2 \text{ is odd} \\ 2 & \text{if } n_1 - n_2 \text{ is even} \end{cases} \quad (1)$$

A size increasing function may refer to a function that increases the size of pixels, and may be applied to convert image information from an array of more smaller pixels to an array of fewer larger pixels.

Converting portion 50 of smaller pixels to yield portion 56 of larger pixels, however, may introduce undesired effects such as distortions in the frequency response of the image information. Frequency response may describe the operation of a device over a specific range of frequencies. According to one embodiment, applying the checkerboard sampling function to the intermediate image information introduces a copy of the information centered about $(\omega_1, \omega_2) = (\pi, \pi)$. The copy may introduce undesirable aliasing effects. To reduce or avoid the aliasing effects, the frequency spectrum of the intermediate image information may be limited to certain frequencies, which are described with reference to FIG. 3A.

Figure 3A:
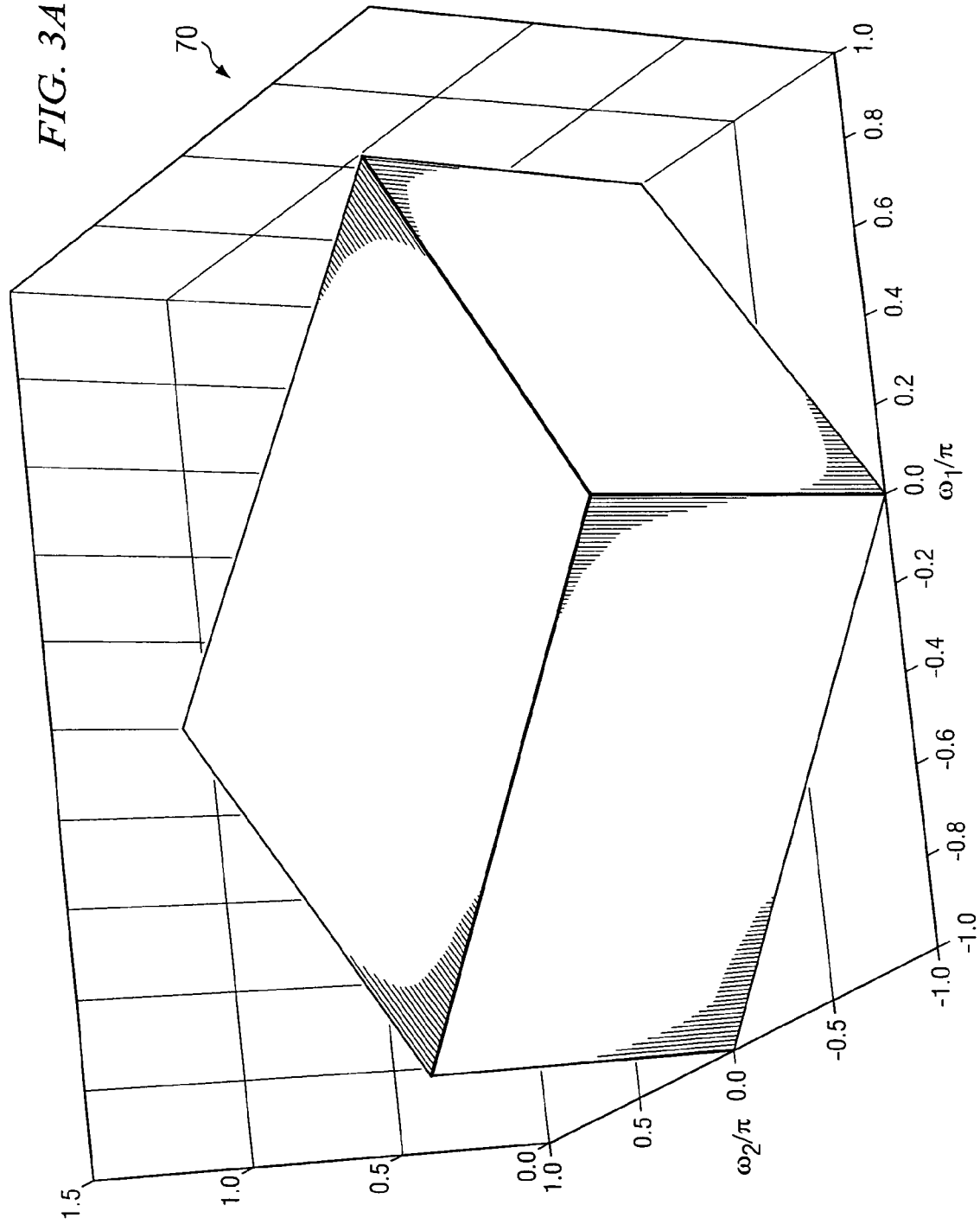
FIG. 3A is a graph illustrating a set of frequencies that ideally may be selected to reduce or avoid aliasing effects.

FIG. 3A is a graph illustrating a set 70 of frequencies that ideally may be selected to reduce or avoid aliasing effects. The graph indicates that frequencies within set 70 are given a value of one, while frequencies outside of set 70 are given a value of zero. Set 70 may be described by Equation (2):

$$\{(\omega_1, \omega_2)\} = \{(\omega_1, \omega_2) : |\omega_1| + |\omega_2| < \pi\} \quad (2)$$

Referring back to FIG. 1, filtering the input image information with the size increasing function does not yield the desired set of frequencies. An actual frequency response resulting from applying the size increasing function is described with reference to FIG. 3B.

Figure 3B:
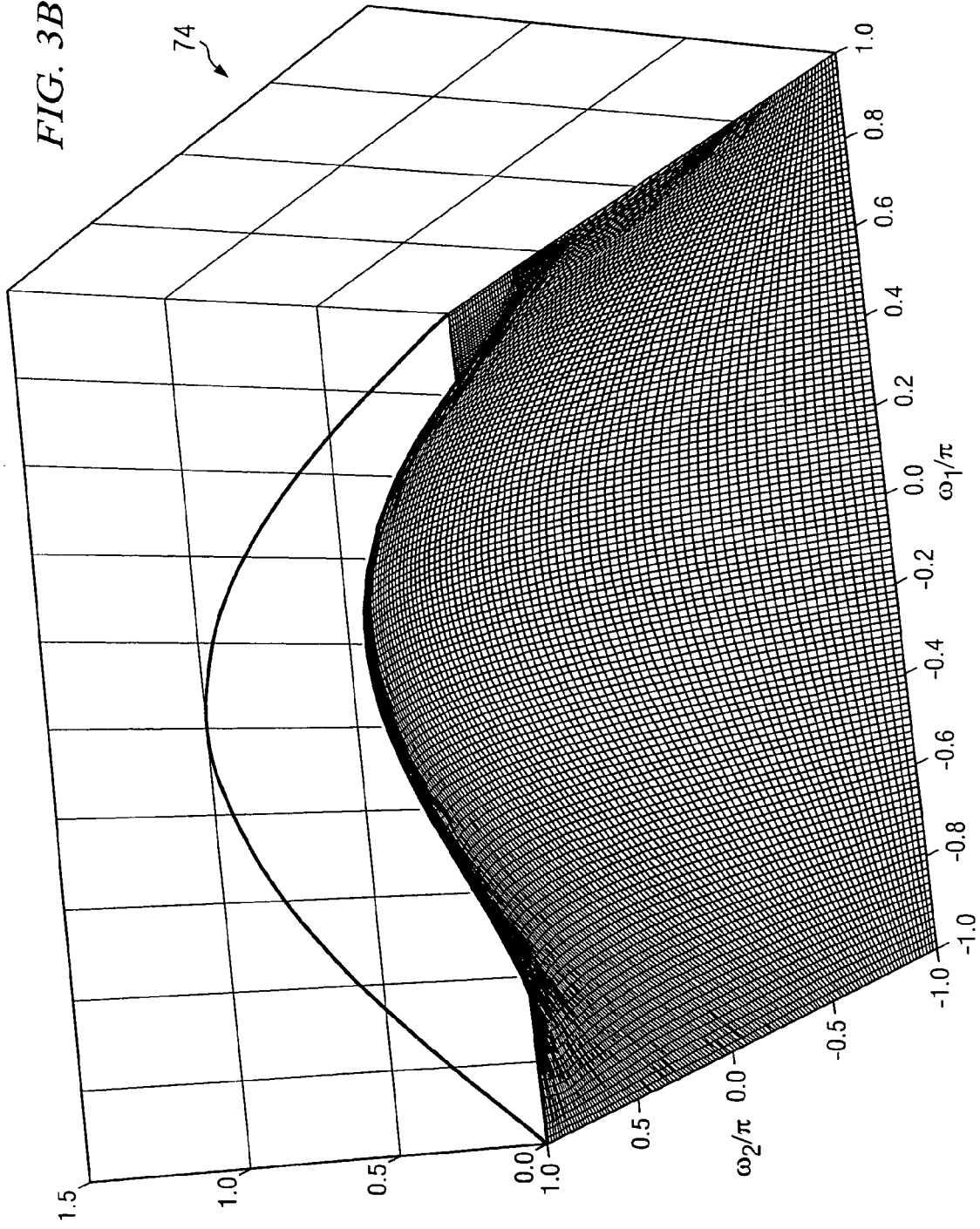
FIG. 3B is a graph illustrating an actual frequency response.

FIG. 3B is a graph illustrating an actual frequency response 74. Filtering image information with the size increasing function tends to attenuate high frequencies. Accordingly, the actual frequency response 74 does not match the desired frequency set 70.

Referring back to FIG. 1, filter set 34 filters the image information to compensate for the distortions to yield at least approximately the desired frequency set 70. Filter set 34 may perform the filtering by iteratively filtering the intermediate image information according to a frequency compensating function. A frequency compensating function may refer to a function that yields a frequency compensating response that compensates for the distortions. An example frequency compensating response is described with reference to FIG. 4.

Figure 4:
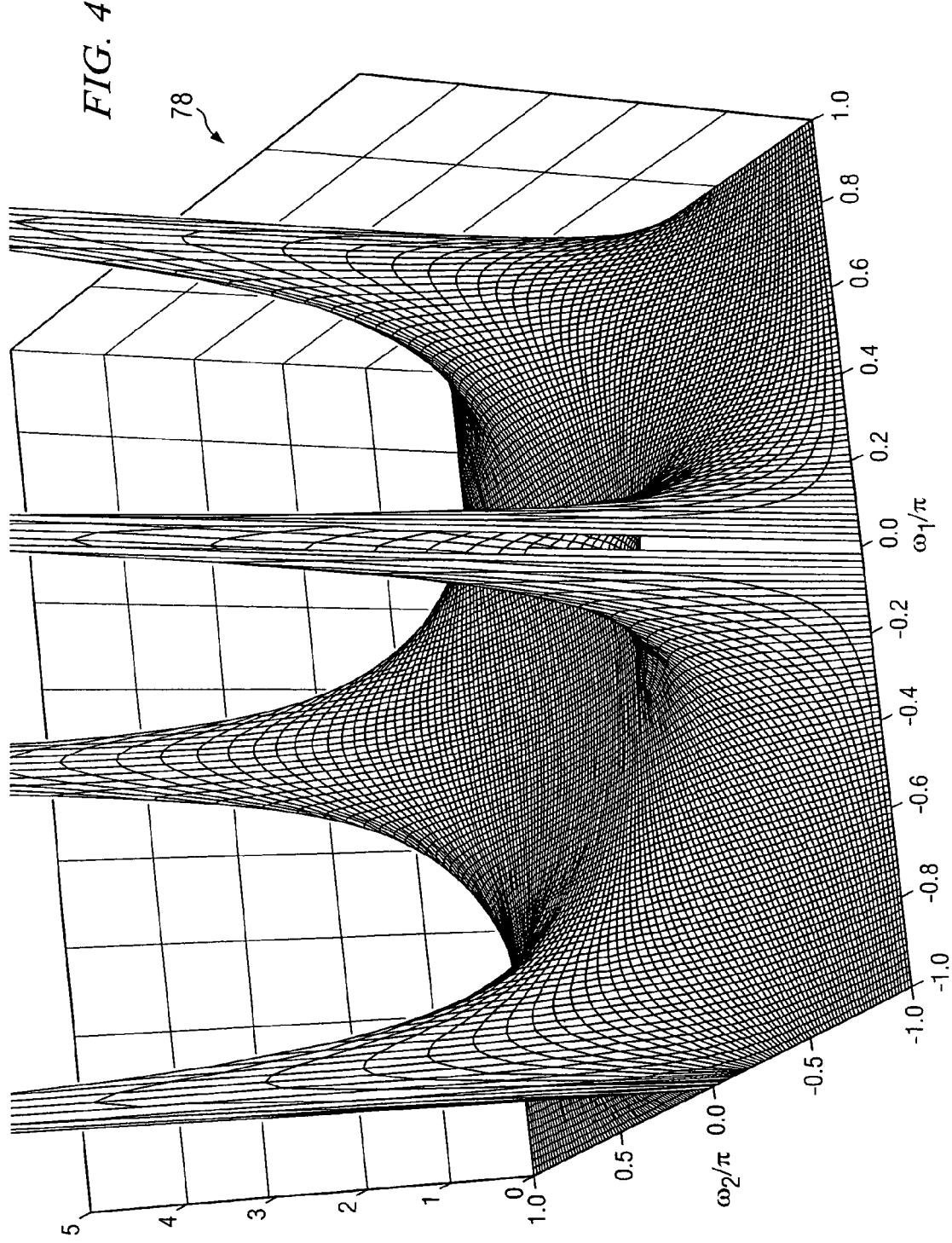
FIG. 4 is a graph illustrating a frequency compensating response that may be applied to the actual frequency response in order to at least approximate the desired frequency set.

FIG. 4 is a graph illustrating a frequency response 78 that may be applied to the actual frequency response 74 in order to at least approximate the desired frequency set 70.

Referring back to FIG. 1, filter set 34 may comprise an infinite input response (IIR) filter having an input kernel $K_1$ given by Equation (3):

$$K_1 = \frac{1}{4} \begin{bmatrix} 1 & 1 \\ 1 & 1 \end{bmatrix} \quad (3)$$

and an output kernel represented by Equation (4):

$$k_2 = \frac{1}{8} \begin{bmatrix} 1 & 0 & 1 \\ 0 & 4 & 0 \\ 1 & 0 & 1 \end{bmatrix} \quad (4)$$

The coefficients of the filter may be implemented with shifts. Alternatively, filter set 34 may comprise a simple finite impulse response (FIR) filter. As more iterations are performed, the filtering may approach that of an infinite impulse response filter.

Filter set 34 may perform any suitable number of iterations. More iterations may yield a sharper image, while fewer iterations may be more efficient. Any suitable number of iterations may be performed, for example, less than 5, 10, 20, 50, or 100 iterations, or greater than 5, 10, 20, 50, or 100 iterations, or any suitable combination of the preceding. Examples of frequency responses after example numbers of iterations are described in more detail with reference to FIGS. 5A and 5B.

Figure 5A:
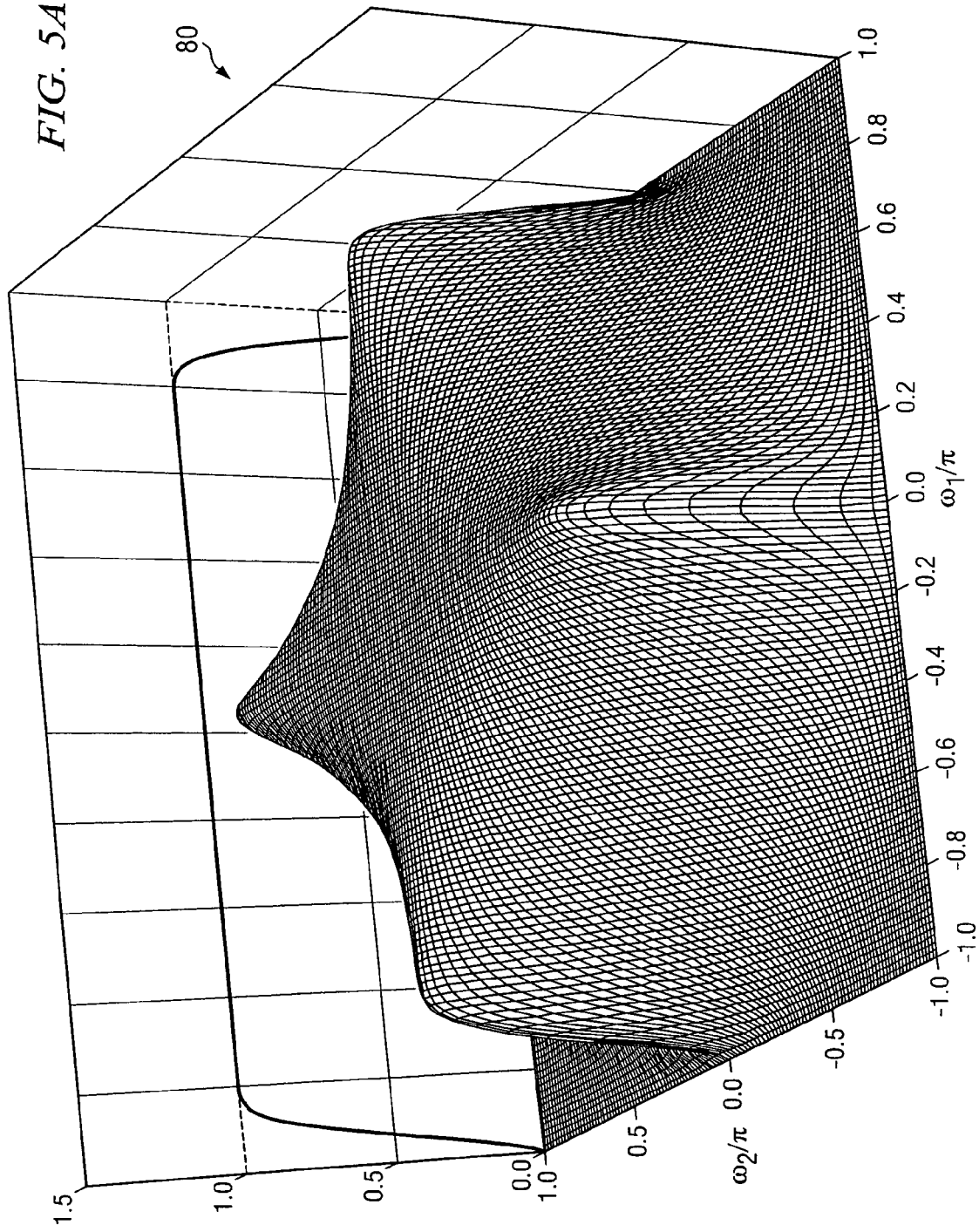
FIG. 5A is a graph illustrating a frequency response after 60 iterations.
Figure 5B:
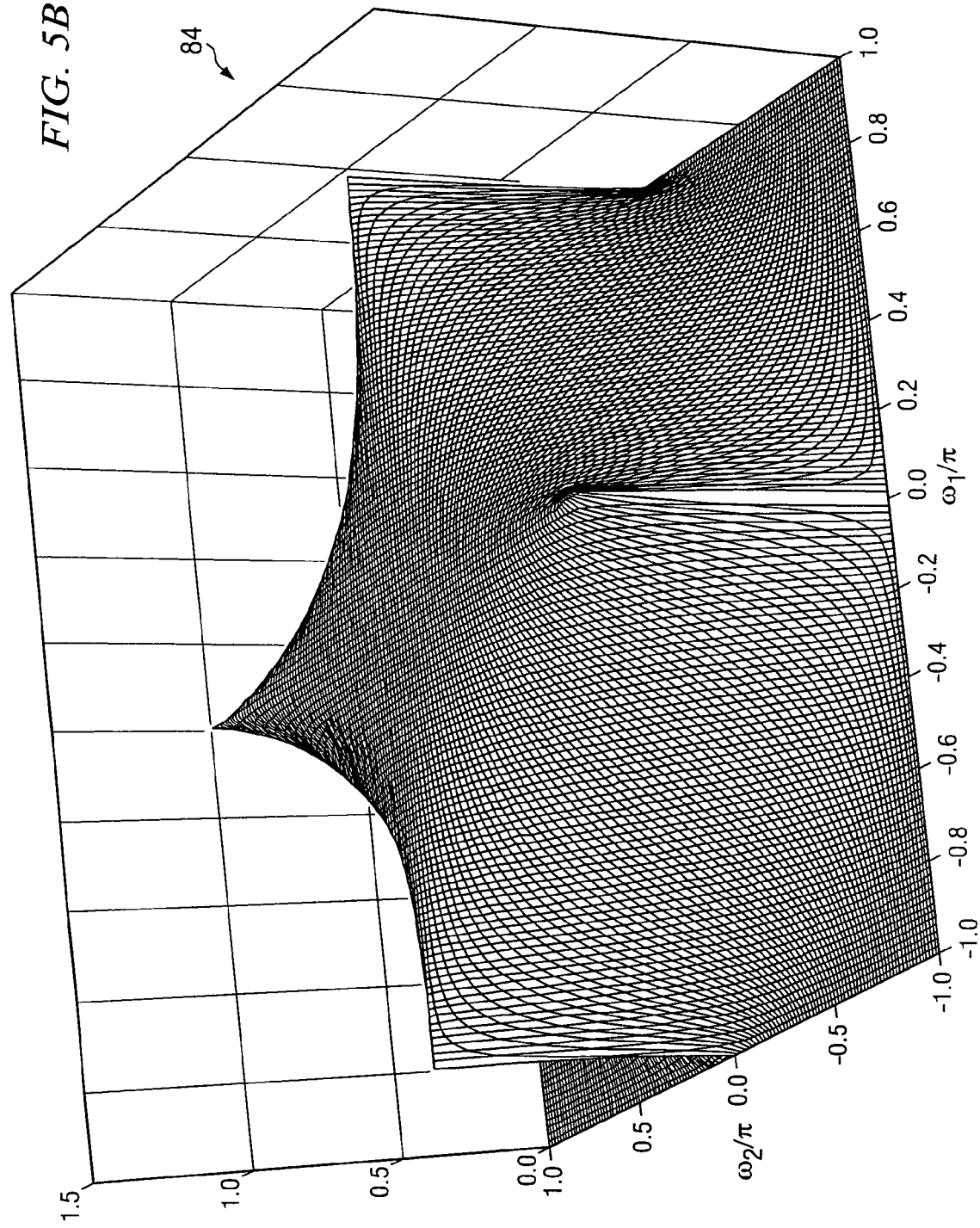
FIG. 5B is a graph illustrating a frequency response after an infinite number of iterations.

FIG. 5A is a graph illustrating a frequency response 80 after 60 iterations. FIG. 5B is a graph illustrating a frequency response 84 after an infinite number of iterations. Frequency response 84 is equal to one along axes $\omega_1=0$ and $\omega_2=0$. Accordingly, horizontal and vertical frequencies are preserved after filtering, that is, horizontal and vertical single pixel lines are preserved.

Referring back to FIG. 1, filter set 34 filters the updated image information to generate sub-image information. Sub-image information may refer to image information from which a sub-image may be generated. A sub-image may refer to an image that may be combined with one or more other sub-images by dithering to yield a single image. Digital signal processor 20 may perform the filtering procedures according to any suitable method, such as the method described with reference to FIG. 6. As an example, sub-image information may be generated by applying a number decreasing function and a size increasing function.

Projector 24 receives sub-image information from digital signal processor 20 and directs light towards dithering element 26 according to the information to generate sub-images for display on screen 28. Projector 24 may comprise any suitable components or combination of components for directing light towards dithering element 26. As an example, projector 24 may comprise a digital-to-analog (D/A) converter if sub-image information is required to be converted from a digital format to an analog format.

As another example, projector 24 may comprise a light source optically coupled to a spatial modulator. The light source receives the sub-image information from digital signal processor 20, and emits light beams directed towards the modulator in accordance with the information. A "light beam" may refer to a beam of light radiation, and may comprise a laser beam. Example light sources may include semiconductor lasers, light-emitting diodes (LEDs), injection laser diodes (ILDs), vertical cavity surface emitting diodes (VCSELs), an array of light sources, lasers, or any other suitable source that emits light beams.

The modulator receives light beams from the light source and provides spatially modulated light beams to dithering element 26 along a projection path 40a. The modulator may comprise any device capable of selectively communicating at least some of an illumination light beam to dithering element 26. Digital signal processor 20 may be operable to configure and program the modulator to process analog signals with digital precision.

According to one embodiment, the modulator comprises a digital micromirror device (DMD). A DMD may refer to a digital form of a spatial light modulator that comprises an electromechanical device including a pixel array. The pixel array may comprise an array, such as a 768×1024 array, of digital tilting mirrors or baseline binary pixels or mirrors. A binary mirror may tilt by a plus or minus angle of, for example, 10 or 12 degrees, for active "on" or "off" positions.

A mirror may include an actuator that permits the mirror to tilt. An actuator may comprise hinges mounted on support posts over underlying control circuitry. The control circuitry provides electrostatic forces that cause each mirror to selectively tilt.

Dithering element 26 actively or passively drops a portion of a light beam transmitted along projection path 40a to provide an offset beam along an off-state path 44, and transmits the remaining portion of the light beam along projection path 40b. Dithering element 26 may comprise dichroic reflectors, fixed Bragg gratings, sub-band rejection filters, lenses, mirrors, prisms, other optical components operable to drop light beams within a bandwidth, or any combination of any of the preceding. While dithering element 26 is illustrated as disparate from projector 24, projector 24 may comprise dithering element 26.

According to one embodiment, dithering element 26 may include an optical selecting element and an optical directional element. The optical selecting element receives a light beam transmitted along projection path 40a and routes a portion of at least a light beam along a rejection path towards the optical directional element. The optical selecting element passes through the remaining wavelengths along projection path 40a to generate first sub-image 14a. The optical directional element receives the reflected light beams transmitted along the rejection path and passes the reflected light beam along offset path 44 to generate second sub-image 14b.

Screen 28 is operable to receive light beams transmitted along projection path 40b and offset path 44 to generate first sub-image 14a image and second sub-image 14b, respectively. First sub-image 14a image and second sub-image 14b form a dithered image 14. A dithered image may refer to an image formed by spatially overlapping one image by a substantially similar image, which may be not be temporally overlapped.

Modifications, additions, or omissions may be made to projection display system 10 without departing from the scope of the invention. The components of system 10 may be integrated or separated according to particular needs. Moreover, the operations of system 10 may be performed by more, fewer, or other modules. For example, the operations of the filters may be performed by any suitable number of filters, or the operations of digital signal processor 20 may be performed by more than one filter. Additionally, operations of system 10 may be performed using any suitable logic comprising software, hardware, other logic, or any suitable combination of the preceding. As used in this document, "each" refers to each member of a set or each member of a subset of a set.

Figure 6:
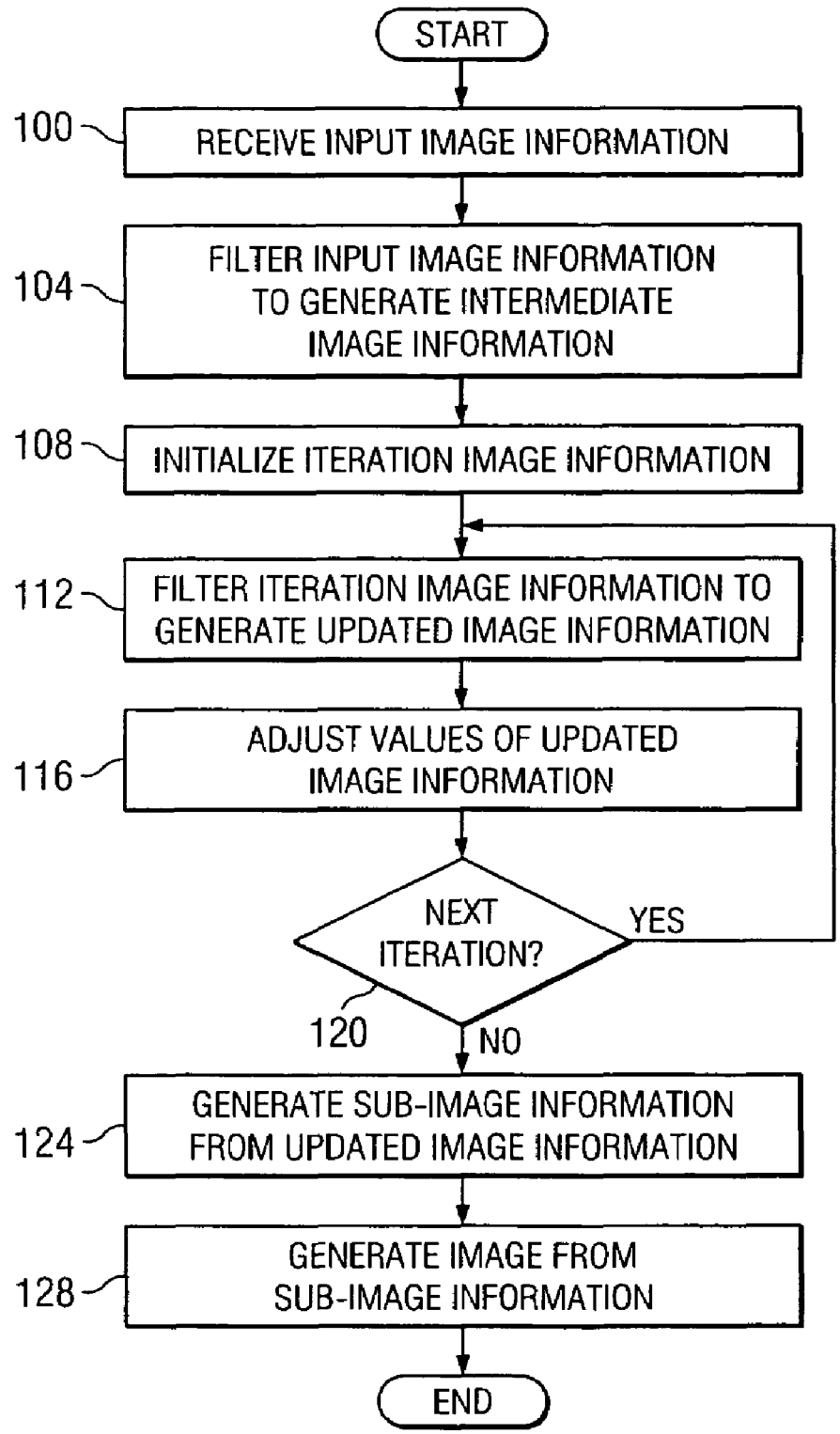
FIG. 6 is a flowchart illustrating one embodiment of a method for filtering image information for generating a dithered image.

FIG. 6 is a flowchart illustrating one embodiment of a method for filtering image information for generating a dithered image. The method may be used with projection display system of FIG. 1 or other suitable system that generates an image.

The method begins at step 100, where digital signal processor 20 receives input image information. The input image information may represent an image generated by an array having more smaller pixels 54 as described with reference to FIG. 2A. The input image information may be represented by matrix $X=\{X_{n_1,n_2}\}$, where $n_1$ and $n_2$ represent coordinate axes.

Steps 104 through 120 are performed to compensate for distortions in the frequency domain introduced by generating the sub-image information. The distortions result from applying the number decreasing function and the size increasing function.

The input image information is filtered to generate intermediate image information at step 104. The intermediate image information may be represented by matrix $W=\{W_{n_1n_2}\}$. Iteration image information is initialized at step 108. The iteration image information may be represented by a matrix $Y=\{Y_{n_1n_2}\}$. The iteration image information may be initialized by setting iteration image matrix Y equal to intermediate image matrix W.

Iteration image information is filtered at step 112 to yield updated iteration image information. The iteration image information may be filtered according to Equation (5):

$$Y = W - k_3 * Y \quad (5)$$

where * represents a convolution operation, and $$k_3 = \frac{1}{8}\begin{bmatrix} 1 & 0 & 1 \\ 0 & -4 & 0 \\ 0 & 0 & 1 \end{bmatrix}.$$

The values of the updated iteration image information are adjusted at step 116. The values of the image information may be subject to certain constraints, and may be adjusted to conform to the constraints. As an example, projector 24 may only accept values within a range of zero to one. The values may be hard clipped to conform to the constraint. As another example, the values may be restricted to being only integer multiples of a fraction based upon the number of bits used to represent each pixel of projector 24.

Sub-image information is generated from the updated image information at step 124. Sub-image information may be generated by applying a sub-image function. A sub-image function may refer to a function that allocates image information to plurality of sub-images. An example sub-image function is described according to Equation (6):

$$f\left(\begin{bmatrix} y_{ij} & y_{i+1,j} \\ y_{ij+1} & y_{i+1,j+1} \end{bmatrix}\right) = \begin{bmatrix} A(y_{ij}) & B(y_{i+1,j}) \\ C(y_{i,j+1}) & D(y_{i+1,j+1}) \end{bmatrix} \quad (6)$$

where A(y) represents assign value y to a first sub-image, B(y) represents eliminate value b, C(y) represents eliminate value y, and D(y) represents assign value y to a second sub-image. Since values associated with functions B and C are eliminated, these values do not need to be processed during the iterations.

A dithered image is generated from the sub-image information at step 128. According to one embodiment, projector 24 and dithering element 26 generate sub-images from the sub-image information for display on screen 28. The sub-images give the illusion of a single dithered image generated from an array having more micromirrors. After generating the image, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that undesired effects resulting from converting image information from an array having more micromirrors to an array having fewer micromirrors may be reduced. Reducing the undesired effects may improve the quality of the resulting dithered image.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for filtering image information to generate a dithered image, comprising:
   receiving input image information, the input image information corresponding to an image generated using a first array comprising a first number of small pixels;
   generating intermediate image information from the input image information, the intermediate image information generated to produce the image using a second array comprising a second number of large pixels, the second number less than the first number, an actual frequency response associated with the image produced using the second array exhibiting one or more aliasing effects, the actual frequency response indicating a frequency response of a device producing the image using the second array;
   repeating the following steps for a plurality of iterations to generate updated image information from the intermediate image information:
   filtering the intermediate image information according to a frequency compensating function in order to adjust the actual frequency response to at least approximate a desired frequency response, the desired frequency response reducing the one or more aliasing effects; and
   generating sub-image information from the updated image information, the sub-image information corresponding to a projected dithered image.

2. The method of claim 1, wherein filtering the intermediate image information further comprises filtering the intermediate image information with a finite impulse response filter operable to:
   filter according to a number decreasing function operable to decrease the first number of the smaller pixels; and
   filter according to the frequency compensating function operable to compensate for an aliasing effect resulting from filtering according to the number decreasing function.

3. The method of claim 1, wherein generating the sub-image information from the updated image information further comprises:
   applying a number decreasing function to the updated image information, the number decreasing function operable to decrease the first number of the small pixels; and
   applying a size increasing function to the updated image information, the size increasing function operable to increase the size of the small pixel.

4. The method of claim 1, wherein filtering the intermediate image information further comprises:
   filtering to select a set of frequencies operable to reduce an aliasing effect associated with a copy of the intermediate image information resulting from an application of a number decreasing function operable to decrease the first number.

5. The method of claim 1, wherein repeating the following steps for a plurality of iterations to generate updated image information from the intermediate image information further comprises:

adjusting one or more values of the updated image information according to one or more constraints.

6. The method of claim 1, wherein generating sub-image information from the updated image information further comprises applying a sub-image function to the updated image information, the sub-image function operable to:
  assign a first set of values of the updated image information to a first sub-image; and
  assign a second set of values to a second sub-image.

7. A digital signal processor for filtering image information to generate a dithered image, comprising:
  an input operable to:
    receive input image information, the input image information corresponding to an image generated using a first array comprising a first number of small pixels; and
  a filter set coupled to the input, the filter set comprising a finite impulse response filter and operable to:
    generate intermediate image information from the input image information, the intermediate image information generated to produce the image using a second array comprising a second number of large pixels, the second number less than the first number, an actual frequency response associated with the image produced using the second array exhibiting one or more aliasing effects, the actual frequency response indicating a frequency response of a device producing the image using the second array;
    repeat the following steps for a plurality of iterations to generate updated image information from the intermediate image information:
      filter the intermediate image information according to a frequency compensating function in order to adjust the actual frequency response to at least approximate a desired frequency response, the desired frequency response reducing the one or more aliasing effects; and
    generate sub-image information from the updated image information, the sub-image information corresponding to a projected dithered image.

8. The processor of claim 7, the filter set comprising a finite impulse response filter operable to filter the intermediate image information by:
  filtering according to a number decreasing function operable to decrease the first number of the small pixels; and
  filtering according to the frequency compensating function operable to compensate for an aliasing effect resulting from filtering according to the number decreasing function.

9. The processor of claim 7, the filter set operable to generate the sub-image information from the updated image information by:
  applying a number decreasing function to the updated image information, the number decreasing function operable to decrease the first number of the small pixels; and
  applying a size increasing function to the updated image information, the size increasing function operable to increase the size of the small pixel.

10. The processor of claim 7, the filter set operable to filter the intermediate image information by:
  filtering to select a set of frequencies operable to reduce an aliasing effect associated with a copy of the intermediate image information resulting from an application of a number decreasing function operable to decrease the first number.

11. The processor of claim 7, the filter set operable to repeat the following steps for a plurality of iterations to generate updated image information from the intermediate image information by:
  adjusting one or more values of the updated image information according to one or more constraints.

12. The processor of claim 7, the filter set operable to generate sub-image information from the updated image information by applying a sub-image function to the updated image information, the sub-image function operable to:
  assign a first set of values of the updated image information to a first sub-image; and
  assign a second set of values to a second sub-image.

13. A system for generating a dithered image, comprising:
  a digital signal processor comprising:
    an input operable to:
      receive input image information, the input image information corresponding to an image generated using a first array comprising a first number of small pixels; and
    a filter set comprising a finite impulse response filter and operable to:
      generate intermediate image information from the input image information, the intermediate image information generated to produce the image using a second array comprising a second number of large pixels, the second number less than the first number, an actual frequency response associated with the image produced using the second array exhibiting one or more aliasing effects, the actual frequency response indicating a frequency response of a device producing the image using the second array;
      repeat the following steps for a plurality of iterations to generate updated image information from the intermediate image information:
        filter the intermediate image information according to a frequency compensating function in order to adjust the actual frequency response to at least approximate a desired frequency response, the desired frequency response reducing the one or more aliasing effects; and
      generate sub-image information from the updated image information, the sub-image information corresponding to a projected dithered image; and
  a projector coupled to the processor, the projector operable to generate a first sub-image and a second sub-image from the sub-image information, the first sub-image and the second sub-image forming the projected dithered image.

14. The system of claim 13, the filter set comprising a finite impulse response filter operable to filter the intermediate image information by:
  filtering according to a number decreasing function operable to decrease the first number of the small pixels; and
  filtering according to the frequency compensating function operable to compensate for an aliasing effect resulting from filtering according to the number decreasing function.

15. The system of claim 13, the filter set operable to generate the sub-image information from the updated image information by:
  applying a number decreasing function to the updated image information, the number decreasing function operable to decrease the first number of the small pixels; and applying a size increasing function to the updated image information, the size increasing function operable to increase the size of the small pixel.

16. The system of claim 13, filter set operable to:
filter the intermediate image information by:
filtering to select a set of frequencies operable to reduce an aliasing effect associated with a copy of the intermediate image information resulting from an application of a number decreasing function operable to decrease the first number.

17. A system for filtering image information to generate a dithered image, comprising:
means for receiving input image information, the input image information corresponding to an image generated using a first array comprising a first number of small pixels;
means for generating intermediate image information from the input image information, the intermediate image information generated to produce the image using a second array comprising a second number of large pixels, the second number less than the first number, an actual frequency response associated with the image produced using the second array exhibiting one or more aliasing effects, the actual frequency response indicating a frequency response of a device producing the image using the second array;
means for repeating the following steps for a plurality of iterations to generate updated image information from the intermediate image information:
filtering the intermediate image information according to a frequency compensating function in order to adjust the actual frequency response to at least approximate a desired frequency response, the desired frequency response reducing the one or more aliasing effects; and
means for generating sub-image information from the updated image information, the sub-image information corresponding to a projected dithered image.

18. A digital signal processor for filtering image information to generate a dithered image, comprising:
an input operable to:
receive input image information, the input image information corresponding to an image generated using a first array comprising a first number of small pixels;
a filter set coupled to the input, the filter set comprising a finite impulse response filter and operable to:
generate intermediate image information from the input image information, the intermediate image information generated to produce the image using a second array comprising a second number of large pixels, the second number less than the first number, an actual frequency response associated with the image produced using the second array exhibiting one or more aliasing effects, the actual frequency response indicating a frequency response of a device producing the image using the second array;
repeat the following steps for a plurality of iterations to generate updated image information from the intermediate image information:
filter the intermediate image information according to a frequency compensating function in order to adjust the actual frequency response to at least approximate a desired frequency response, the desired frequency response reducing the one or more aliasing effects, the filtering operable to select a set of frequencies operable to reduce an aliasing effect associated with a copy of the intermediate image information resulting from an application of the number decreasing function; and
adjust one or more values of the updated image information according to one or more constraints; and
generate sub-image information from the updated image information, the sub-image information corresponding to a projected dithered image, the sub-image information generated by applying a sub-image function to the updated image information, the sub-image function operable to:
assign a first set of values of the updated image information to a first sub-image; and
assign a second set of values to a second sub-image, the sub-image information generated by:
applying the number decreasing function to the updated image information, the number decreasing function operable to decrease the first number of the small pixels, the number decreasing function yielding a copy of the input image information; and
applying a size increasing function to the updated image information, the size increasing function operable to increase the size of the small pixel; and
a projector coupled to the processor, the projector operable to generate the first sub-image and the second sub-image from the sub-image information, the first sub-image and the second sub-image forming the projected dithered image.

* * * * *